US009355586B2

(12) United States Patent
Sugimoto

(10) Patent No.: US 9,355,586 B2
(45) Date of Patent: May 31, 2016

(54) DISPLAY DEVICE, DISPLAY DRIVING METHOD AND DISPLAY DRIVER

(71) Applicant: Futaba Corporation, Mobara-shi, Chiba-ken (JP)

(72) Inventor: Terukazu Sugimoto, Mobara (JP)

(73) Assignee: FUTABA CORPORATION, Mobara-Shi, Chiba-Ken (JP)

( * ) Notice: Subject to any disclaimer, the term of this patent is extended or adjusted under 35 U.S.C. 154(b) by 254 days.

(21) Appl. No.: 14/224,105

(22) Filed: Mar. 25, 2014

(65) Prior Publication Data

US 2014/0292744 A1 Oct. 2, 2014

(30) Foreign Application Priority Data

Mar. 26, 2013 (JP) ................................ 2013-063664

(51) Int. Cl.
*G06F 3/038* (2013.01)
*G09G 3/20* (2006.01)

(52) U.S. Cl.
CPC .......... *G09G 3/20* (2013.01); *G09G 2310/0221* (2013.01); *G09G 2310/0275* (2013.01); *G09G 2310/08* (2013.01); *G09G 2370/08* (2013.01)

(58) Field of Classification Search
None
See application file for complete search history.

(56) References Cited

U.S. PATENT DOCUMENTS 5,841,431 A * 11/1998 Simmers .................. G06F 1/32 345/103
7,391,414 B2 6/2008 Wakimoto et al.
7,667,707 B1 2/2010 Margulis
7,834,869 B2 11/2010 Kondo et al.
2004/0075622 A1 4/2004 Shiuan et al.
2005/0030254 A1 2/2005 Jung et al.
2005/0206638 A1 9/2005 Wakimoto et al.
2006/0214873 A1 9/2006 Park et al.
2013/0069998 A1* 3/2013 Fergason ............. G09G 3/3406 345/690

FOREIGN PATENT DOCUMENTS

CN 1734539 A 2/2006
CN 101840682 A 9/2010
JP 2005-266573 A 9/2005
JP 2006-47511 A 2/2006

(Continued)

OTHER PUBLICATIONS

Chinese Office Action dated Nov. 23, 2015, including search report, issued in corresponding Chinese Patent Application No. 201410116821.1 and English translation thereof.
Taiwanese Office Action dated Nov. 26, 2015, including search report, issued in corresponding Taiwanese Patent Application No. 103111068 and English translation thereof.

(Continued)

*Primary Examiner* — Joseph Haley
*Assistant Examiner* — Ifedayo Iluyomade
(74) *Attorney, Agent, or Firm* — Bacon & Thomas, PLLC

(57) ABSTRACT

A display device includes: a plurality of display panels arranged adjacent to each other in a line scanning direction to form one screen; a master controller configured to drive one of the display panels; and one or more slave controllers configured to drive the other display panels, each of the slave controllers corresponding to each of the other display panels. The master controller is configured to drive the display panel based on a scanning control signal and a clock signal which are generated, and output the generated scanning control signal and the generated clock signal and each of the slave controllers is configured to drive the corresponding display panel based on the scanning control signal and the clock signal inputted from the master controller.

12 Claims, 14 Drawing Sheets

(56) References Cited

FOREIGN PATENT DOCUMENTS

| | | | |
|---|---|---|---|
| JP | 2006-259240 | A | 9/2006 |
| JP | 2012-133047 | A | 7/2012 |
| KR | 10-2006-0047943 | A | 5/2006 |
| TW | I222619 | B | 10/2004 |
| TW | 200643850 | A | 12/2006 |
| TW | I304967 | B | 1/2009 |
| TW | I382378 | B | 1/2013 |

OTHER PUBLICATIONS

Japanese Office Action dated Mar. 5, 2015 issued in corresponding Japanese application No. 2013-063664 and English translation thereof.

Korean Office Action dated Jan. 19, 2015 issued in corresponding Korean application No. 10-2014-0034791 and English translation thereof.

* cited by examiner

<MASTER OPERATION EXAMPLE III (DISPLAY STOP)>

<SLAVE OPERATION EXAMPLE iii (DISPLAY STOP)>

DISPLAY DEVICE, DISPLAY DRIVING METHOD AND DISPLAY DRIVER

FIELD OF THE INVENTION

The present invention relates to a display device in which display panels are arranged adjacent to each other in a line scanning direction to form one screen, a display driving method of the display device, and a display driver mounted on the display device.

BACKGROUND OF THE INVENTION

Conventionally, there has been known display devices using an organic light emitting diode (OLED), a liquid crystal display (LCD), a vacuum fluorescent display, and a field emission display (FED) as display panels for displaying images.

In the flat display panels described above, dots as light emitting units are two-dimensionally arranged, and each dot is made to emit light at a luminance corresponding to display data.

As a light emitting method for displaying an image on the display panel, there are a method (dot driving method) for sequentially controlling the dots to emit light, a method (line driving method) for sequentially controlling lines, each of which has dots linearly arranged, by allowing the dots belonging to each of the lines to simultaneously emit light, a method (frame driving method) for controlling all dots belonging to a frame constituting one screen to simultaneously emit light, and the like.

Further, in Japanese Patent Application Publication No. 2000-306532, there has been proposed a driving technique of increasing a so-called duty cycle by multiple times by arranging dots in a plurality groups of grids and scanning the dots of the respective groups at the same cycle in a rightward direction or leftward direction, in a display device using, e.g., a vacuum fluorescent display (VFD).

In recent years, with an increasing demand for a larger screen and a higher definition image, the number of dots in the display device has also increased dramatically. This also requires a driver circuit capable of driving more dots.

With an increase in the number of dots, in a conventional driving technique, the time for driving one dot becomes short, and the luminance of each dot is set to a high level to obtain an image with high luminance. However, the lifetime of the display panel is shortened by setting the luminance of the dots to a high level. Further, in the case of using the line driving method, the quality of the displayed image deteriorates due to the mutual interference between the lines. In particular, in the display device using OLED, which is drawing attention in view of compact, light weight and the like, these problems are remarkable.

SUMMARY OF THE INVENTION

In view of the above, the present invention provides a display device capable of coping with high definition and large screen, improving display quality by displaying an image having no mutual interference between lines, and realizing high luminance without unnecessarily increasing the luminance of dots.

First, a display device according to the present invention includes: a plurality of display panels arranged adjacent to each other in a line scanning direction to form one screen; a master controller configured to drive one of the display panels; and one or more slave controllers configured to drive the other display panels, each of the slave controllers corresponding to each of the other display panels, wherein the master controller is configured to drive the display panel based on a scanning control signal and a clock signal which are generated, and output the generated scanning control signal and the generated clock signal, and wherein each of the slave controllers is configured to drive the corresponding display panel based on the scanning control signal and the clock signal inputted from the master controller.

With the above configuration, the master controller and the slave controller drive the respective display panels. The master controller outputs the generated scanning control signal and clock signal, and the slave controller receives the scanning control signal and the clock signal. Accordingly, it is possible to realize a configuration in which the scanning control signal and the clock signal on the master controller can be supplied to the slave controller.

Second, each of the slave controllers may receive the scanning control signal and the clock signal outputted from the master controller, and drive the corresponding display panel based on the scanning control signal and the clock signal received.

Thus, the same scanning control signal and clock signal can be used in the master controller and the slave controller. As a result, in the display panels, the execution of the line scanning can be controlled in common.

Third, the master controller may generate the scanning control signal indicating line scanning start at a timing based on a display start command which is inputted, and perform the line scanning start according to the scanning control signal, and each of the slave controller may perform the line scanning start according to the scanning control signal supplied from the master controller.

Thus, it is possible to make the line scanning start timing on the master controller side coincident with the line scanning start timing on the slave controller side, and it is possible to achieve a state in which the same numbered lines are caused to emit light in the display panels (maintain the scan synchronization).

Fourth, each of the master controller and the slave controllers may start display data output to pixels of each line of the corresponding display panel at the timing based on the display start command.

If the display data output is not performed, the image display is not performed (display OFF) even when the line scanning is performed. When the line scanning is executed and the display data output is performed, the image display is carried out (display ON). In this case, the display data output may not be necessarily started at the same time in the display panels. This is because scan synchronization is maintained by performing the line scanning according to the common scanning control signal. Therefore, in each display panel, the display data output may be started in response to the display start command.

Fifth, the master controller may generate the scanning control signal indicating line scanning stop in response to a display stop command which is inputted, and perform the line scanning stop at the end of a current frame according to the scanning control signal of the line scanning stop, and each of the slave controllers may perform the line scanning stop at the end of a current frame according to the scanning control signal of the line scanning stop, which is supplied from the master controller.

Thus, it is possible to make the scanning end timings of the display panels coincident with each other in response to the display stop command.

Sixth, each of the master controller and the slave controllers may stop the display data output to pixels of each line along with the line scanning stop.

Thus, when the line scanning stops in each display panel, the display data output is stopped and the display is turned off.

Seventh, each of the slave controllers may stop the display data output to the pixels of each line at the end of a current frame in response to the display stop command.

While performing line scanning according to the scanning control signal, the slave controller stops the display data output at the end of the current frame in response to the display stop command, so the display is turned off.

Eighth, each of the master controller and the slave controllers may include: a clock generator; a first selector configured to select one of the clock signal generated by the clock generator and the clock signal which is inputted; a scanning control signal generating unit configured to generate the scanning control signal in response to a command which is inputted; a second selector configured to select one of the scanning control signal generated by the scanning control signal generating unit and the scanning control signal which is inputted; and a timing controller configured to control line scanning and display data output by using the clock signal selected by the first selector and the scanning control signal selected by the second selector.

This makes it possible to realize the master controller and the slave controller having the same configuration.

Ninth, the master controller is preferably configured such that the first selector selects the clock signal generated by the clock generator, and the second selector selects the scanning control signal generated by the scanning control signal generating unit, and each of the slave controllers is preferably configured such that the first selector selects the clock signal which is to be inputted, and the second selector selects the scanning control signal which is to be inputted.

Accordingly, it is possible to realize a connection configuration in which the clock signal and the scanning control signal can be used commonly in the master controller and the slave controller having the same configuration.

A display driving method according to the present invention provides a display driving method for a plurality of display panels which is arranged adjacent to each other in a line scanning direction to form one screen, the method including: driving, by a master controller corresponding to one of the display panels, the corresponding display panel based on a scanning control signal and a clock signal which are generated, and outputting the scanning control signal and the clock signal; and receiving the scanning control signal and the clock signal outputted from the master controller by each of slave controllers corresponding respectively to the other display panels, and driving the corresponding display panel based on the scanning control signal and the clock signal.

Thus, by using the same scanning control signal and clock signal in the master controller and the slave controller, it is possible to commonly control the execution of the line scanning in the display panels.

A display driver according to the present invention includes: a clock generator; a first selector configured to select one of a clock signal generated by the clock generator and a clock signal which is to be inputted; a scanning control signal generating unit configured to generate the scanning control signal in response to a command which is to be inputted; a second selector configured to select one of the scanning control signal generated by the scanning control signal generating unit and a scanning control signal which is to be inputted; and a timing controller configured to control line scanning and display data output by using the clock signal selected by the first selector and the scanning control signal selected by the second selector.

Thus, it is possible to realize a display driver that can be commonly used in the aforementioned master controller and slave controller.

According to the present invention, in the case of increasing the screen size and the brightness by using a plurality of display panels, by using the common scanning control signal and clock signal in the master controller and the slave controller, it is possible to commonly control the execution of the line scanning in a plurality of display panels. Thus, it is possible to realize an image having no mutual interference between the lines, and realize the improvement of display quality.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, an embodiment in accordance with the present invention will be described in detail with reference to the accompanying drawings.

<Configuration of Display Panel>

Figure 1:
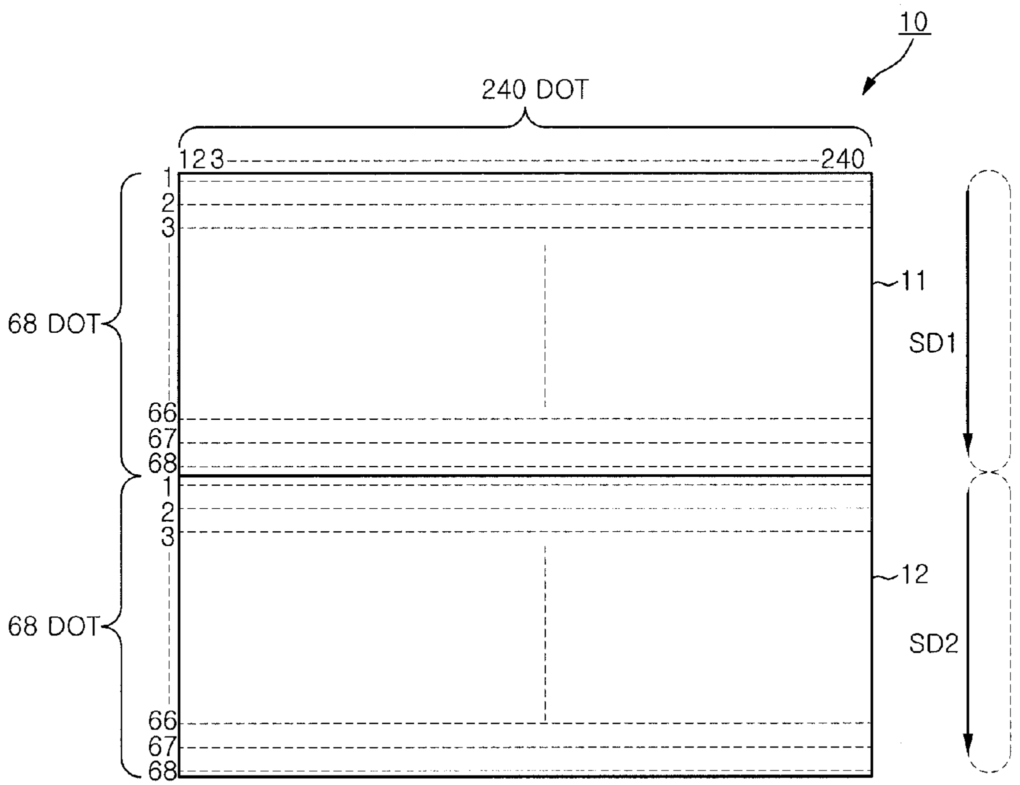
FIG. 1 is an explanatory diagram of a display panel in a display device according to an embodiment of the present invention.

First, a configuration of a display panel employed in a display device 1 in accordance with an embodiment of the present invention will be described with reference to FIG. 1. FIG. 1 schematically shows a display unit 10 of the display device 1 according to the present embodiment. As shown in FIG. 1, the display unit 10 has a display area defined by a display panel 11 and a display panel 12 adjacent to each other. The display panels 11 and 12 have the same configuration.

Specifically, the display panels 11 and 12 are disposed on one sheet of glass to constitute the display unit 10. Each of the display panels 11 and 12 is configured such that, as effective pixels forming a display image, 240 dots are arranged in the horizontal direction and 68 dots are arranged in the vertical direction (line scanning direction), for example. Thus, each of the display panels 11 and 12 has 16320 (=240×68) effective dots. Each dot becomes a display pixel.

A dashed line in the horizontal direction shown in the display area in FIG. 1 represents a line of the pixels arranged in the horizontal direction. Each of the display panels 11 and 12 has the first to the 68th effective display lines. Each of the display lines has the first to the 240th dots arranged in the horizontal direction as effective pixels. In the present embodiment, each dot is formed of a self-emitting element using an OLED.

In this manner, the display unit 10 in the display device of this embodiment is constituted by a plurality of the display panels 11 and 12 which are disposed adjacent to each other in the line scanning direction to form one screen. In each of the display panels 11 and 12, line scanning is performed independently. In this embodiment, line scanning for the display panels 11 and 12 is performed in scanning directions SD1 and SD2, respectively, as shown in FIG. 1 by selecting each line in the order from the first line to the 68th line.

Description will be made on operations and effects of the display device 1 in accordance with the present embodiment in which two sheets of the display panels 11 and 12 are disposed adjacent to each other to form the display unit 10.

Generally, the display panel is configured to have one display data line (luminance control line) for all dots arranged in each vertical line, and one scanning line for all dots arranged in each horizontal line. For example, in case of a display panel of 240 dots×136 dots, the display panel has 240 display data lines, each extending in the vertical direction, and 136 scanning lines, each extending in the horizontal direction.

Further, in the case of using, e.g., a line driving method, while selecting the scanning lines one by one by a scanning signal, a display data signal (luminance signal) is applied to each dot of the selected scanning line from the corresponding display data line to allow dots of the selected scanning line to emit light. This is performed sequentially from the first scanning line to the last scanning line so that one frame of the image is displayed.

In the case of passively driving the display panel, only one line emits light at a time. As the size of the screen increases and the number of dots (lines) increases, the time for driving one dot is shortened and the luminance of the display image is accordingly reduced. Thus, in order to obtain an enough luminance, typically, it is necessary to increase the light emission luminance of each dot. This shortens the lifetime of dots. This is the same even in the case of a dot driving method.

In the present embodiment, as described above, two display panels 11 and 12 are disposed adjacent to each other to form the display unit 10, and each of the display panels 11 and 12 constitutes the half of the screen. Then, the display panels 11 and 12 are driven independently. Thus, each of the display panels 11 and 12 is sufficiently driven by driving the half lines of the entire screen. In this case, it is possible to make driving time per one line longer. That is, for example, by using two display panels 11 and 12 of 240×68 dots instead of one display panel of 240×136 dots, two lines (one line of the display panel 11 and one line of the display panel 12) emit light at the same time, thereby doubling the duty cycle.

Further, by using the persistence of vision occurring in a person viewing the display unit 10, it is possible to double the luminance of the image displayed on the display unit 10 even if the dots of each line have the same luminance level. In other words, sufficient luminance can be obtained in the display image without greatly increasing the light emission luminance of the dots. As the above, as the configuration shown in FIG. 1, the method in which one screen is constituted by a plurality of panels which are driven independently is suitable for a larger screen and higher definition.

<Line Interference in No Scan Synchronization>

Figure 2A:
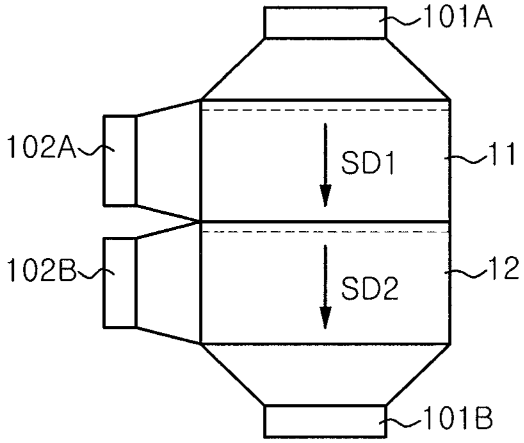
FIG. 2A (RELATED ART)
FIGS. 2A to 2C are explanatory diagrams of interference between lines that may occur when a plurality of panels are arranged adjacent to each other.
Figure 2B:
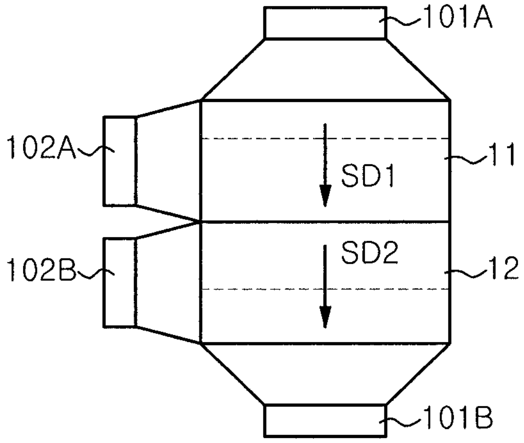
FIG. 2B (RELATED ART)
Figure 2C:
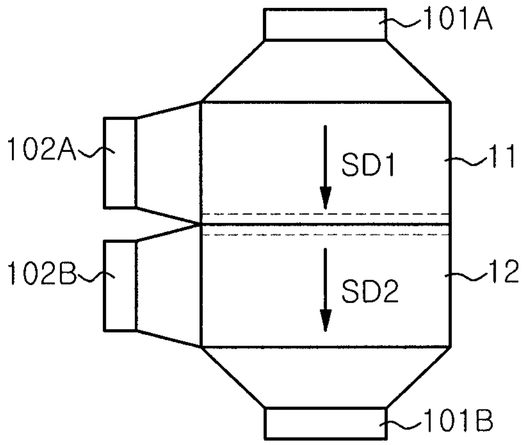
FIG. 2C (RELATED ART)

Image quality degradation (generation of bright line) occurring when the two display panels 11 and 12 are disposed adjacent to each other will be described with reference to FIGS. 2A to 2C. In FIGS. 2A to 2C, dashed lines in the display panels 11 and 12 represent selected lines (light-emitting lines) in line scanning.

In a case where the display panels 11 and 12 are controlled to display independently, as shown in FIG. 2A, a display data signal driver 101A and a scanning line driver 102A are provided for the display panel 11 and a display data signal driver 101B and a scanning line driver 102B are provided for the display panel 12. Accordingly, a display data signal is supplied to each dot of the selected line by the display data signal driver 101A while the lines are selected sequentially by the scanning line driver 102A, and the lines are driven sequentially from the first line to emit light.

Similarly, a display data signal is supplied to each dot of the selected line by the display data signal driver 101B while the lines are selected sequentially by the scanning line driver 102B, and the lines are driven sequentially from the first line to emit light.

In this case, generally, for example, the group of the display data signal driver 101A and the scanning line driver 102A and the group of the display data signal driver 101B and the scanning line driver 102B use respectively clock signals generated by clock generators provided independently of each other, and start display driving according to a display start command signal (display start command) supplied from the outside. Herein, the respective clock generators (oscillators) are basically designed to oscillate at the same frequency, but have actually a small frequency error in many cases. Further, the timing at which the display start command signal is inputted may be deviated. Accordingly, scan synchronization may not be obtained between the display panels 11 and 12. The scan synchronization refers to a state in which the lines are scanned by selecting the same numbered lines at the same time in the display panels 11 and 12.

Even if line scanning has been started from the first line substantially at the same time in the display panels 11 and 12 as shown in FIG. 2A, clock frequency errors are accumulated as the line/frame is in progress, and different lines may be scanned at the same time as shown in FIG. 2B. Further, if the input timing of the display start command signal is deviated, the numbers of the lines being scanned at the same time in the display panels 11 and 12 may be different from each other. Accordingly, as shown in FIG. 2C, there occur cases in which the lines being scanned at the same time in the display panels 11 and 12 are adjacent to each other. For example, this corresponds to a situation in which the final line or the line near the final line of the display panel 11 and the first line or the line near the first line of the display panel 12 emit light simultaneously.

When two adjacent lines emit light simultaneously as shown in, e.g., FIG. 2C, it becomes an image including a portion in which the adjacent lines and the lines near them are viewed as a so-called bright line, and the quality of the displayed image is deteriorated. Basically, the line scanning uses the persistence of vision, but the persistence of vision becomes significant when two lines that emit light simultaneously are adjacent to each other with an interval of, e.g., 10 lines or less. Accordingly, in the portion where the adjacent lines emit light simultaneously, a bright line is perceived to human eyes.

In the present embodiment, in order to prevent the degradation of image quality due to the occurrence of the bright line, the line scanning is performed such that the same numbered lines can be selected at the same time in the display panels 11 and 12. That is, the line scanning is performed with scan synchronization, thereby preventing the adjacent lines from emitting light simultaneously.

<Display Device Configuration>

Figure 3:
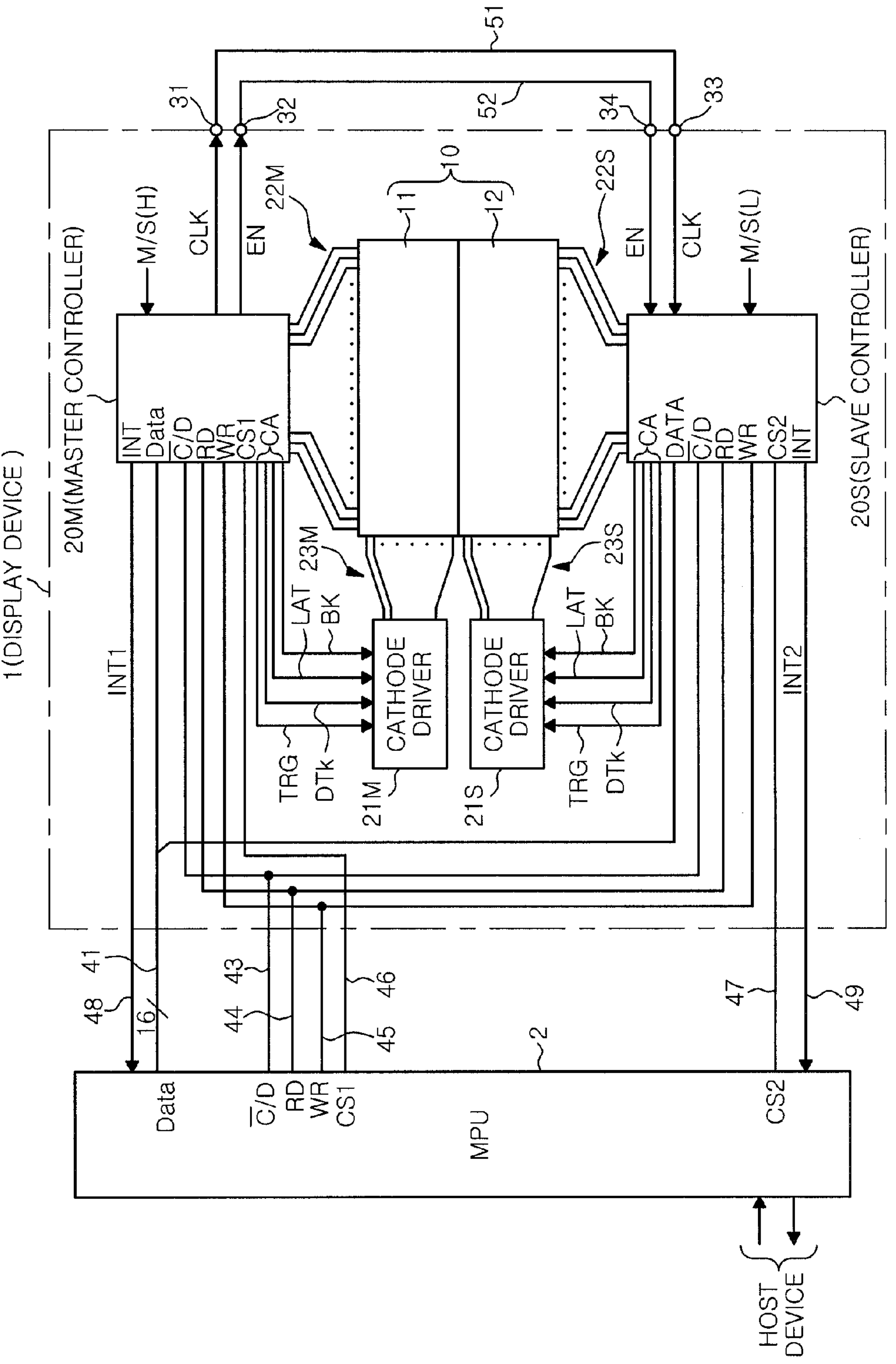
FIG. 3 is a block diagram of the display device according to the embodiment.

A specific configuration of the display device in accordance with the present embodiment will be described. FIG. 3 shows the display device 1 according to the present embodiment and a micro processing unit (MPU) 2 for controlling display operations of the display device 1.

In the display device 1, as described with reference to FIG. 1, the display unit 10 includes two display panels 11 and arranged adjacent to each other in the line scanning direction to thereby form one screen. Each of the display panels 11 and 12 is configured such that, as shown in FIG. 1, 240 dots are arranged in the horizontal direction and 68 dots are arranged in the vertical direction (line scanning direction), for example. Thus, each of the display panels 11 and 12 has, for example, 16320 dots (240 dots in the horizontal direction and 68 dots in the vertical direction) as effective pixels representing a display image. For these dots, the display data lines and the scanning lines are arranged.

Specifically, for the display panel 11, 240 display data lines 22M are provided. Each of the display data lines 22M is connected in common to 68 dots arranged in the column direction (vertical direction) on the display panel 11. Further, 68 scanning lines 23M are provided. Each of the scanning lines 23M is connected in common to 240 dots arranged in the row direction (horizontal direction). By applying display data signals (luminance signals) to 240 dots of one line selected among from the scanning lines 23M, from the display data lines 22M, each dot of the line is driven to emit light with a luminance corresponding to the display data signal.

Similarly, for the display panel 12, 240 display data lines 22S are provided. Each of the display data lines 22S is connected in common to 68 dots arranged in the column direction (vertical direction) on the display panel 12. Further, 68 scanning lines 23S are provided. Each of the scanning lines 23S is connected in common to 240 dots arranged in the row direction (horizontal direction). By applying display data signals (luminance signals) from the display data lines 22S to 240 dots of a line selected among from the scanning lines 23S, each dot of the line is driven to emit light with a luminance corresponding to the display data signal.

In addition, for display driving of the display panel 11, a master controller 20M and a cathode driver 21M are provided. For display driving of the display panel 12, a slave controller 20S and a cathode driver 21S are provided.

The master controller 20M drives the display panel 11 in response to the display start command signal applied from the MPU 2. Specifically, the master controller 20M controls the cathode driver 21M to perform line scanning. The cathode driver 21M outputs sequentially a scanning signal to, e.g., 68 scanning lines 23M corresponding to horizontal lines on the display panel 11. Further, the master controller 20M outputs display data signals (luminance signals) to, e.g., 240 display data lines 22M corresponding to vertical lines on the display panel 11 from its anode driver (to be described later with reference to FIG. 6) in synchronization with the line scanning by the cathode driver 21M. Accordingly, each dot of one line selected among from the scanning lines 23M is driven to emit light.

Meanwhile, the slave controller 20S drives the display panel 12 in response to the display start command signal from the MPU 2, and controls to perform line scanning in synchronization with the master controller 20M, which will be described in detail below. Specifically, the slave controller 20S controls the cathode driver 21S to perform the line scanning such that scanning signals are outputted sequentially to, e.g., 68 scanning lines 23S corresponding to horizontal lines on the display panel 12 while keeping in synchronization with the line scanning of the cathode driver 21M. Further, the slave controller 20S outputs display data signals (luminance signals) from its anode driver (to be described later with reference to FIG. 6) to, e.g., 240 display data lines 22S corresponding to vertical lines on the display panel in synchronization with the line scanning by the cathode driver 21S. Accordingly, each dot of one line selected among from the scanning lines 23S is driven to emit light.

As described above, the MPU 2 is connected to the display device 1 having the display unit 10 (the display panels 11 and 12), the master controller 20M, the slave controller 20S and the cathode drivers 21M and 21S. The MPU 2 controls start and stop of the display operation of the display device 1, and supply of display data to the display device 1. Further, the MPU 2 is connected to an external host device (not shown). For example, the MPU 2 controls the display device 1 such that display contents instructed from the host device are displayed in the display device 1.

The MPU 2 communicates various signals with the master controller 20M and the slave controller 20S through various transmission paths. Specifically, the MPU 2 communicates a data bus signal DATA with the master controller 20M and the slave controller 20S through a data bus 41 that is, e.g., a digital bus having a bus width of 16 bits. As the data bus signal DATA to be communicated through the data bus 41, there are a command signal, a display data signal and the like.

An identification signal line 43 is provided between the MPU 2, and the master controller 20M and the slave controller 20S. The MPU 2 sends an identification signal $\overline{C}$/D indicating whether command signal communication or data signal communication is performed, to the master controller 20M and the slave controller 20S through the identification signal line 43. A read signal line 44 is provided between the MPU 2, and the master controller 20M and the slave controller 20S. The MPU 2 transmits a read signal RD instructing a read timing to the master controller 20M and the slave controller 20S through the read signal line 44. A write signal line 45 is provided between the MPU 2, and the master controller 20M and the slave controller 20S. The MPU 2 transmits a write signal WR instructing a write timing to the master controller 20M and the slave controller 20S via the write signal line 45.

A chip selection signal line 46 is provided between the MPU 2 and the master controller 20M. The MPU 2 transmits a chip selection signal CS1 to the master controller 20M through the chip selection signal line 46. A chip selection signal line 47 is provided between the MPU 2 and the slave controller 20S. The MPU 2 transmits a chip selection signal CS2 to the slave controller 20S through the chip selection signal line 47.

The MPU 2 controls the operations of the master controller 20M and the slave controller 20S by the transmission and reception of various signals. Specifically, the MPU 2 selects as a communication target at least one of the master controller 20M and the slave controller 20S by using the chip selection signals CS1 and CS2 and performs communication of the command signal and the data signal.

For example, if the MPU 2 sets the write signal WR to be outputted to the write signal line 45 to an L level (low level), the master controller 20M or the slave controller 20S takes a 16-bit signal on the data bus 41 into an internal register and memory, which will be described later with reference to FIG. 6. The master controller 20M or the slave controller 20S determines whether a signal on the data bus 41 is a command signal or a data signal by the identification signal $\overline{C}$/D on the identification signal line 43, and takes the signal into the register if it is the command signal and takes the signal into the memory if it is the data signal.

Figure 4A:
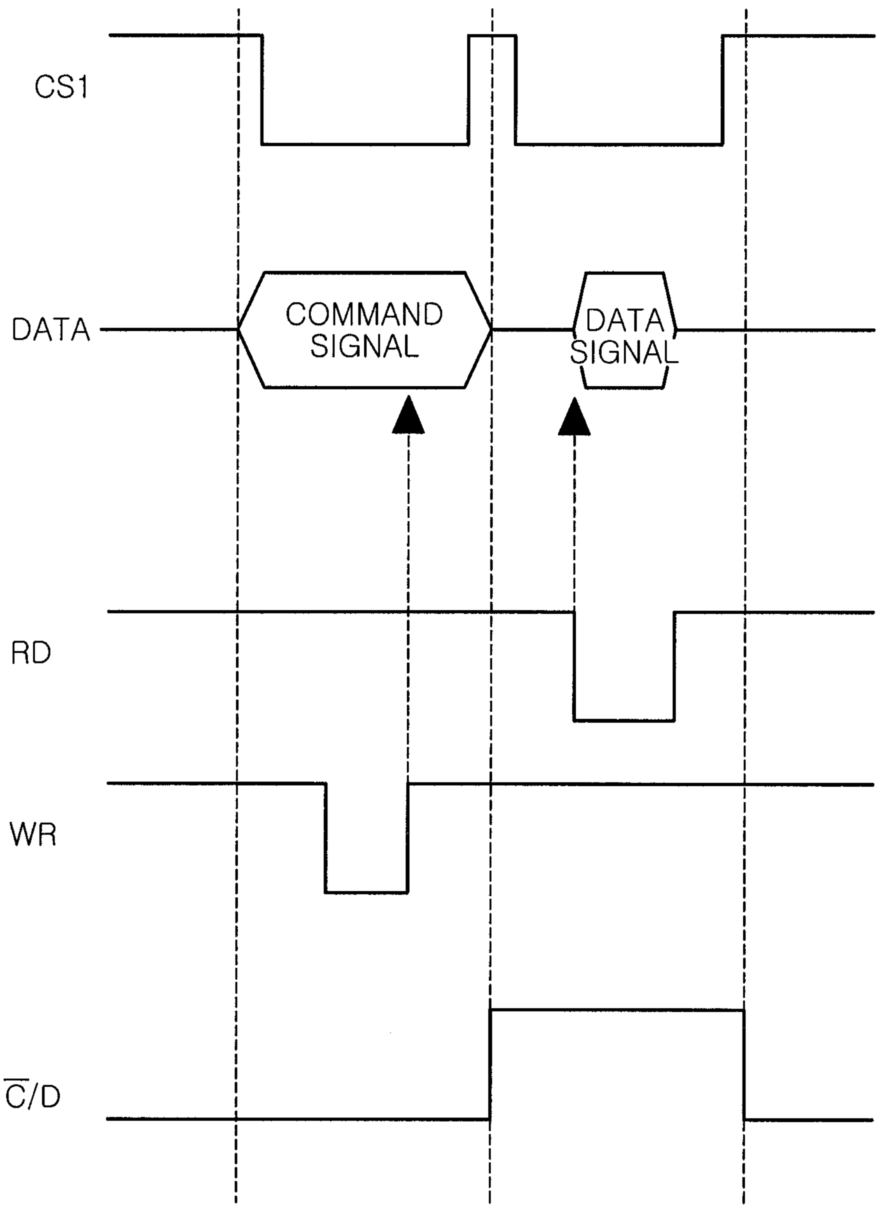
FIGS. 4A and 4B are diagrams for explaining communications of a command signal and a data signal in the display device according to the embodiment.
Figure 4B:
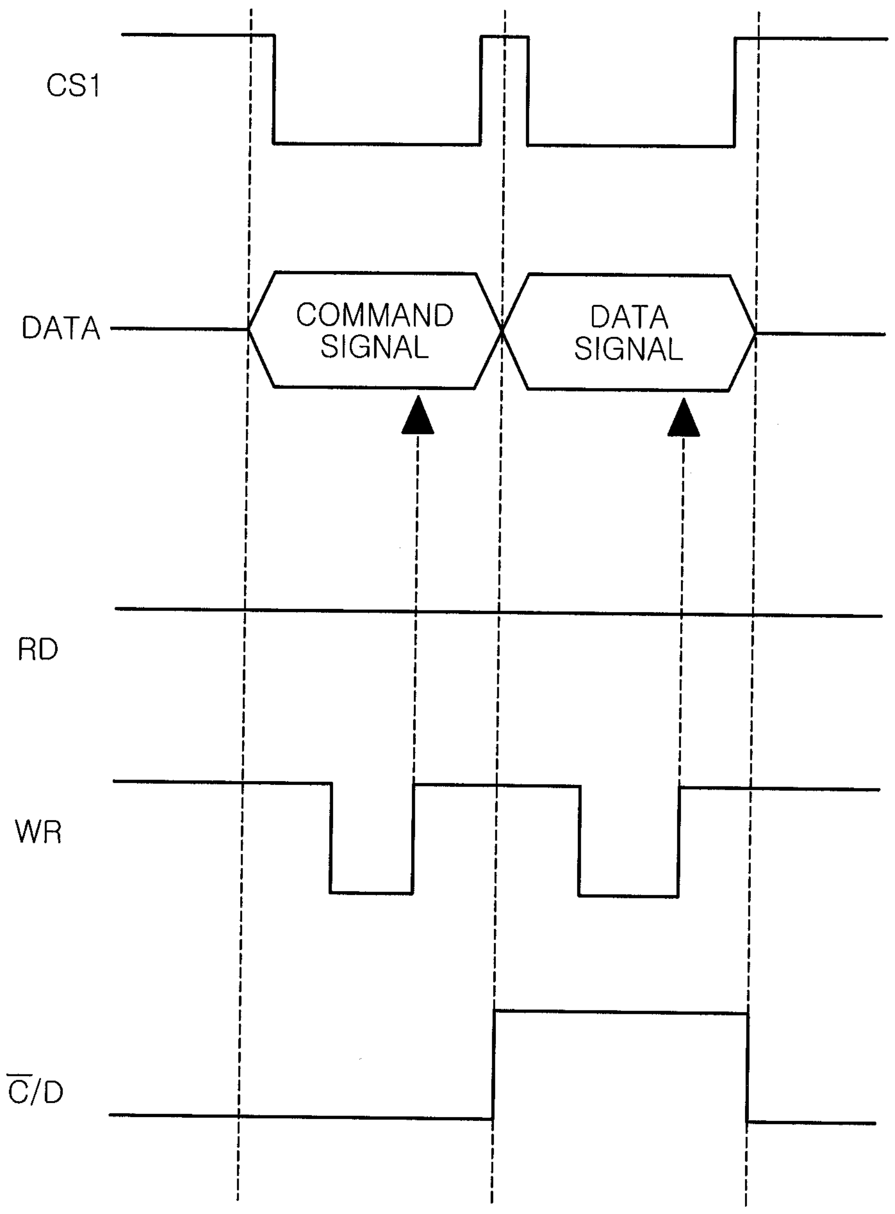

FIGS. 4A and 4B are diagrams showing communications of signals between the MPU 2 and the master controller 20M. FIG. 4A shows an operation when the MPU 2 reads data from the master controller 20M, and FIG. 4B shows an operation when the MPU 2 writes data to the master controller 20M.

Further, since FIGS. 4A and 4B show examples in which the MPU 2 communicates with the master controller 20M, the MPU sets the chip selection signal CS1 (which is, e.g., low active) to the L level at the timings shown in the drawing. When the MPU 2 communicates with the slave controller 20S, the MPU 2 sets the chip selection signal CS2, which is not shown in FIGS. 4A and 4B, to the L level at the same timings as those of the chip selection signal CS1, and performs the communications to be described below.

When the MPU 2 reads data from the master controller 20M, as shown in FIG. 4A, the identification signal $\overline{C}$/D is set to the L level that indicates a command signal, and the command signal is outputted as the data bus signal DATA through the data bus 41. Then, the MPU 2 sets the write signal WR to the L level at a predetermined timing and then sets it to a H level. When the write signal WR rises from the L level to the H level, the master controller 20M recognizes that the data bus signal DATA on the data bus 41 is the command signal, and captures the signal.

Subsequently, the MPU 2 sets the read signal RD from the H level to the L level at a predetermined timing after setting the identification signal $\overline{C}$/D to the H level. When the read signal RD falls to the L level from the H level, the master controller 20M outputs a data signal instructed by the command signal through the data bus 41. The data signal is captured by the MPU 2.

When the MPU 2 sends data to the master controller 20M, as shown in FIG. 4B, at first, the identification signal $\overline{C}$/D is set to the L level indicating a command signal and the command signal is outputted as the data bus signal DATA through the data bus 41. Then, the MPU 2 sets the write signal WR to the L level at a predetermined timing and then sets to the H level. When the write signal WR rises from the L level to the H level, the master controller 20M recognizes that the data bus signal DATA on the data bus 41 is the command signal and captures the command signal.

Subsequently, the MPU 2 outputs a data signal as the data bus signal DATA after setting the identification signal $\overline{C}$/D to the H level. After that, the MPU 2 sets the write signal WR to the L level at a predetermined timing and then set to the H level. When the write signal WR rises from the L level to the H level, the master controller 20M recognizes that the data bus signal DATA on the data bus 41 is the data signal and captures the data signal. The data signal may include display data signals (luminance signals) of an image to be displayed on the display panel 11.

In the case of performing the display driving of the display panel 11, the MPU 2 transmits the display start command signal through the communications as shown in FIG. 4B. When receiving the command signal as described above, the master controller 20M starts the display of the image on the display panel 11 by driving the scanning lines 23M for the display panel 11 and outputting display data to the display data lines 22M.

Further, when the display on the display panel 11 is terminated, the MPU 2 transmits a display stop command signal (display stop command) through the communications as shown in FIG. 4B. When receiving the display stop command signal, the master controller 20M stops the display of the image on the display panel 11 by terminating the driving of the scanning lines 23M for the display panel 11 and the output of display data to the display data lines 22M.

Communications with the slave controller 20S are the same as the communications with the master controller 20M. In the driving of the display panel 12 by the slave controller 20S, the slave controller 20S starts and stops the line scanning of the scanning lines 23S in synchronization with the line scanning of the scanning lines 23M by the master controller 20M as will be described later. Further, the slave controller 20S starts and stops outputting of display data to the display data lines 22S according to the display start command signal and the display stop command signal from the MPU 2.

Further, as shown in FIG. 4A, the MPU 2 may obtain various types of information as the data signal from the master controller 20M and the slave controller 20S by setting the read signal RD to the L level. However, since this function is not required in the description of the present embodiment, an explanation thereof will be omitted.

Referring to FIG. 3 again, a connection configuration between the master controller 20M and the cathode driver 21M will be explained. In the case of executing the display on the display panel 11, the master controller 20M supplies a cathode driver control signal CA to the cathode driver 21M to execute the line scanning through the cathode driver 21M. The cathode driver control signal CA includes a trigger signal TRG, a line selection signal DTk, a latch signal LAT, and a blanking signal BK as illustrated.

Figure 5A:
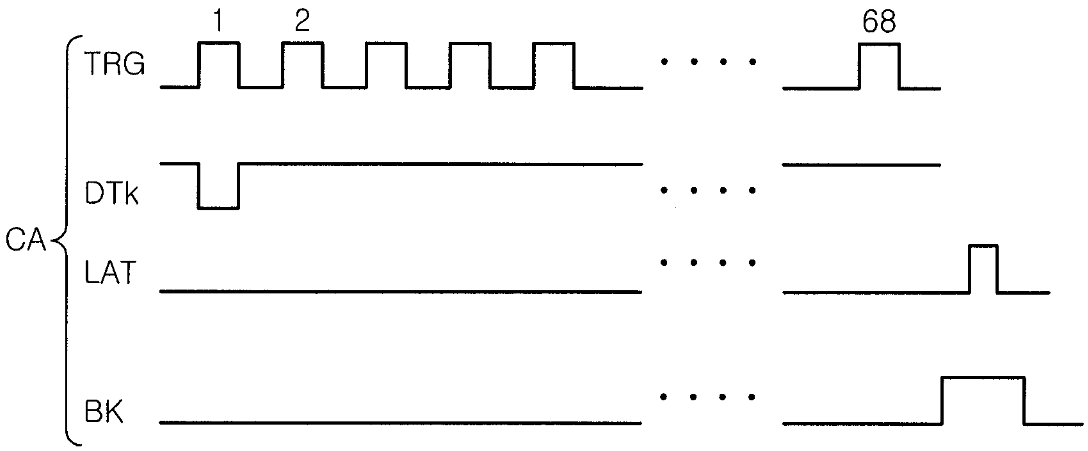
FIGS. 5A and 5B are diagrams of explaining signals and an INT signal to a cathode driver in the display device according to the embodiment.

FIG. 5A shows the cathode driver control signal CA. When the line selection signal DTk becomes the L level at the falling edge of the trigger signal TRG, a line to be scanned is selected. FIG. 5A shows a state in which the first line is selected. Then, the selection of the line (the first line in this case) is confirmed at the rising edge of the latch signal LAT. The cathode driver 21M outputs a scanning signal to the scanning line 23M corresponding to the selected line.

The cathode driver control signal CA is supplied from the master controller 20M to the cathode driver 21M and the scanning lines are sequentially selected. As such, the cathode driver 21M sequentially scans the first line to the 68th line through the scanning lines 23M. Further, the blanking signal BK is a signal which defines a timing at which none of scanning lines is selected in the scanning process for the lines.

The slave controller 20S performs the line scanning by the cathode driver 21S and executes the display on the display panel 12. To this end, the slave controller 20S supplies the cathode driver control signal CA to the cathode driver 21S. The contents of the cathode driver control signal CA supplied by the slave controller 20S are the same as those supplied by the master controller 20M.

Figure 5B:
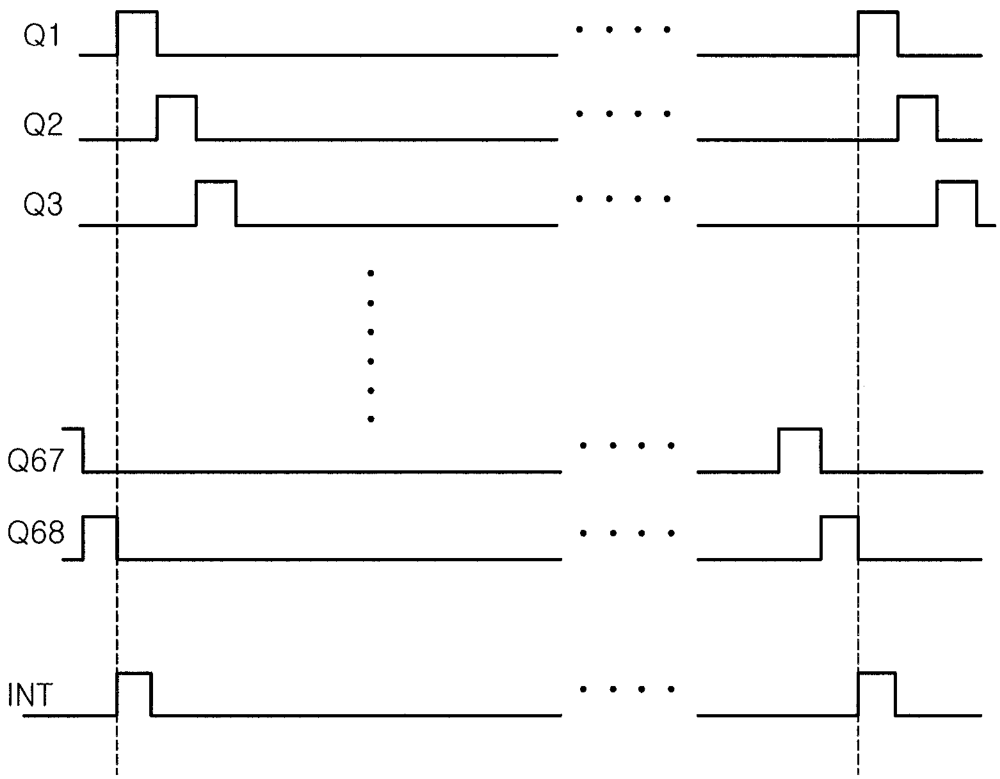

Further, the master controller 20M and the slave controller 20S output interrupt signals INT1 and INT2, respectively. The interrupt signals INT1 and INT2 are signals which are generated at the scanning timing of the first line in each frame. FIG. 5B shows scanning signals outputted to the scanning lines 23M and 23S from output terminals Q1~Q68 of the cathode drivers 21M and 21S. The master controller 20M and the slave controller 20S generate the interrupt signals INT (INT1 and INT2) at the timing of outputting the scanning signal from the output terminal Q1, respectively. The interrupt signals INT1 and INT2 are supplied to the MPU 2.

In the present embodiment, the display device 1 is configured such that the line scanning by the cathode driver 21M and the cathode driver 21S are performed in synchronization (scan synchronization) with each other. For this scan synchronization, the master controller 20M is configured to output a clock signal CLK and a scan enable signal EN (scanning control signal), which are internally generated, to the outside.

Specifically, upon receiving the display start command signal from the MPU 2, the master controller 20M generates the scan enable signal EN in response thereto. Then, the master controller 20M sets a timing of starting the line scanning by the cathode driver 21M and a timing of outputting the display data signal to the display data lines 22M in accordance with the clock signal CLK and the scan enable signal EN. In the display device 1 according to the present embodiment, as shown in FIG. 3, the master controller 20M is configured to output the internally generated clock signal CLK and the scan enable signal EN through terminals 31 and 32 to the outside.

The clock signal CLK outputted from the terminal 31 is supplied to a terminal 33 through a wire 51. Further, the scan enable signal EN outputted from the terminal 32 is supplied to a terminal 34 through a wire 52.

The slave controller 20S is configured to receive the clock signal CLK and the scan enable signal EN through the terminals 33 and 34. Further, the slave controller 20S sets a timing of starting the line scanning by the cathode driver 21S and a timing of outputting the display data signal to the display data lines 22S in accordance with the inputted clock signal CLK and scan enable signal EN, which will be described in detail below with reference to FIGS. 7A to 9B. Thus, in the present embodiment, the master controller 20M and the slave controller 20S can drive the display panels 11 and 12, respectively, by commonly using the clock signal CLK and the scan enable signal EN.

With such an operation, the slave controller 20S does not necessarily have to have a configuration for generating the clock signal CLK and the scan enable signal EN. That is, an internal circuit configuration of the slave controller 20S may be simplified as compared to the master controller 20M. However, if a display driver is formed as an integrated circuit (IC) that can be used for both of the master controller 20M and the slave controller 20S, it is advantageous in terms of cost and manufacturing efficiency of the display device 1. Thus, it is possible to manufacture a display driver having the configuration shown in FIG. 6 as, e.g., an IC, and use for both the master controller 20M and the slave controller 20S.

Figure 6:
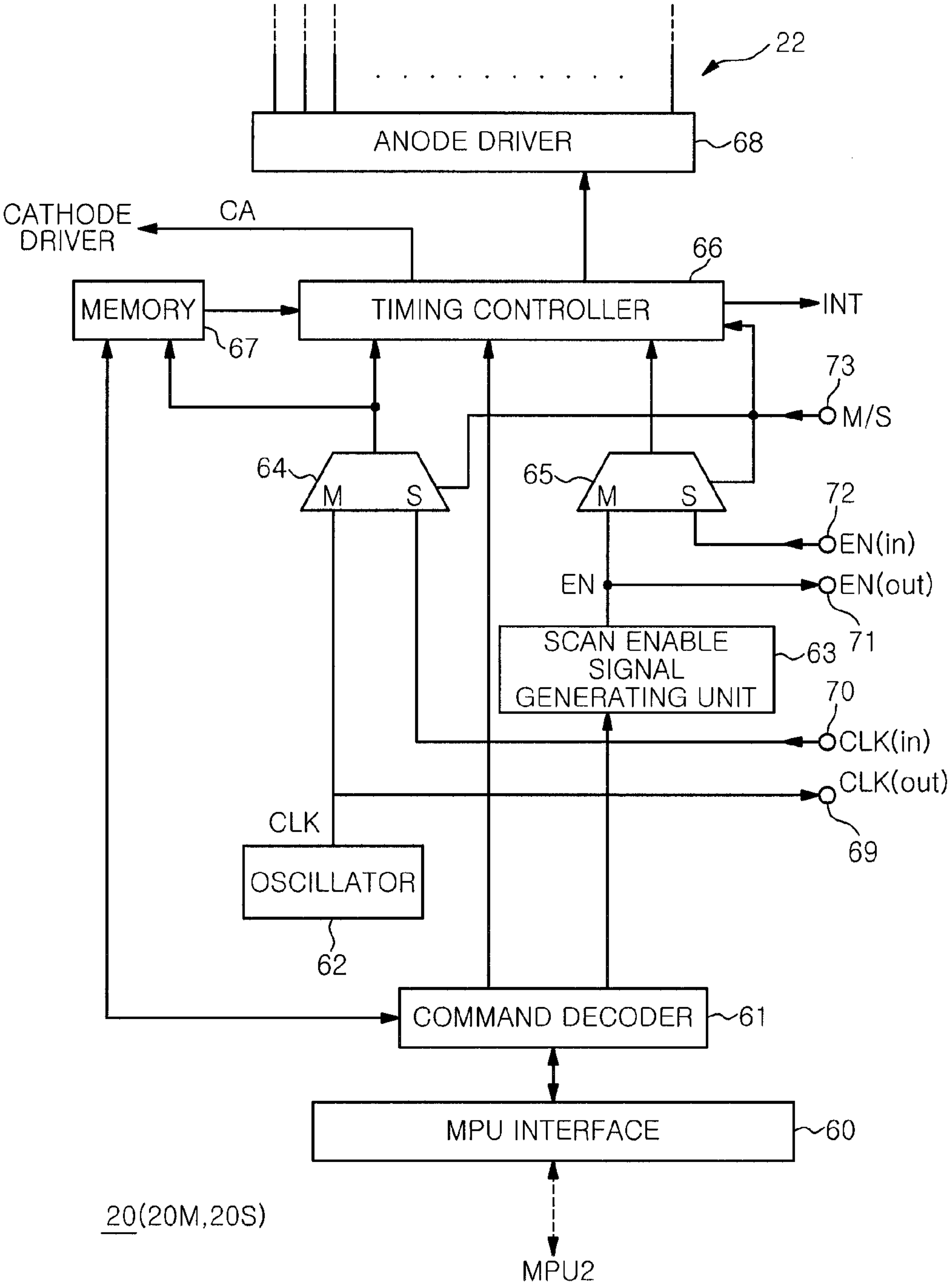
FIG. 6 is a block diagram of a master controller and a slave controller in the display device according to the embodiment.

FIG. 6 shows a configuration example of a display driver (the master controller 20M and the slave controller 20S). The display driver 20 includes a MPU interface 60, a command decoder 61, an oscillator 62, a scan enable signal generating unit 63, a first selector 64, a second selector 65, a timing controller 66, a memory 67 and an anode driver 68.

The MPU interface 60 is an interface circuit for performing various communications with the MPU 2. The transmission and reception of the data bus signal DATA, the identification signal $\overline{C}$/D, the read signal RD, the write signal WR and the chip selection signal CS1 (or CS2) are performed between the MPU 2 and the MPU interface 60. The command decoder 61 receives a command signal transmitted from the MPU 2 to put it into the internal register and decodes the command signal. The memory 67 stores a data signal transmitted from, e.g., the MPU 2.

If the command signal captured at a predetermined timing of the write signal WR is the display start command or the display stop command, the command decoder 61 notifies the scan enable signal generating unit 63 of the information on the command signal. Further, the command decoder 61 notifies the timing controller 66 to execute an operation according to the content of the command signal. In addition, the command decoder 61 stores in the memory 67 the data signal (e.g., display data signal) captured at a predetermined timing of the write signal WR.

The oscillator 62 generates the clock signal CLK for display drive control. The clock signal CLK is supplied to the memory 67 and used as a clock for a write and a read operation of data. Further, the clock signal CLK is supplied to an M terminal of the first selector 64. Further, the clock signal CLK is outputted to the outside of the display driver 20 through a terminal 69. An S terminal of the first selector 64 is connected to a terminal 70.

The scan enable signal generating unit 63 generates the scan enable signal EN instructing start and stop of the line scanning. The scan enable signal generating unit 63 sets the scan enable signal EN to, e.g., the H level immediately or after a predetermined delay time when the display start command signal is recognized by the command decoder 61. Further, the scan enable signal generating unit 63 sets the scan enable signal EN to, e.g., the L level immediately or after a predetermined delay time when the display stop command signal is recognized by the command decoder 61.

The scan enable signal EN outputted from the scan enable signal generating unit 63 is supplied to an M terminal of the second selector 65. Then, the scan enable signal EN is outputted to the outside of the display driver 20 through a terminal 71. An S terminal of the second selector 65 is connected to a terminal 72.

Each of the first and the second selector 64 and 65 selects and outputs an input based on an M/S signal inputted from a terminal 73. Specifically, each of the first and the second selector 64 and 65 selects and outputs the input of the M terminal if the M/S signal is, e.g., of the H level, and selects and outputs the input of the S terminal if the M/S signal is, e.g., of the L level.

The timing controller 66 sets the drive timing of the scanning lines 23M and 23S and the display data lines 22 (22M and 22S) of the display panels 11 and 12. The anode driver 68 outputs the display data signal to the display data lines 22 at the drive timing specified by the timing controller 66. The clock signal CLK is supplied to the timing controller 66 through the first selector 64, and the scan enable signal EN is also supplied to the timing controller 66 through the second selector 65. Further, a signal corresponding to the content of the command signal is supplied to the timing controller 66 from the command decoder 61. The timing controller 66 sets the timing of line scanning and the timing of outputting the display data signal to the display data lines 22M and 22S based on the clock signal CLK, the scan enable signal EN and the content of the command signal.

Then, the timing controller 66 outputs the cathode driver control signal CA to execute the line scanning by the cathode drivers 21M and 21S. Further, the timing controller 66 specifies the timing of outputting the display data signal to the display data lines 22M and 22S by the anode driver 68, reads the display data from the memory 67 and transmits the display data to the anode driver 68. Thus, in synchronization with the scanning timing of each of the scanning lines 23M and 23S, the anode driver 68 outputs the display data signals for dots of the corresponding line to the display data lines 22. Further, the timing controller 66 outputs the interrupt signals INT (INT1 and INT2) at the beginning of the frame, i.e., at the scanning timing of the first line.

In the case of using the display driver 20 as the master controller 20M, the terminals 69 and 71 are respectively connected to the terminals 31 and 32 of FIG. 3. The terminal 73 is connected to a H-level constant potential such that the M/S signal of the H level is supplied. Thus, the display driver 20 serves as the master controller 20M and the clock signal CLK generated by the oscillator 62 is supplied to the memory 67 and the timing controller 66 through the first selector 64 and used in the display drive control.

Further, the scan enable signal EN generated by the scan enable signal generating unit 63 is supplied to the timing controller 66 through the second selector 65 and used in the display drive control. In addition, the clock signal CLK generated by the oscillator 62 and the scan enable signal EN generated by the scan enable signal generating unit 63 are outputted to the outside of the display driver 20.

On the other hand, in the case of using the display driver 20 as the slave controller 20S, the terminals 70 and 72 are respectively connected to the terminals 33 and 34 of FIG. 3. Further, the terminal 73 is connected to an L-level constant potential such that the M/S signal of the L level is supplied. Thus, the display driver 20 serves as the slave controller 20S and the clock signal CLK outputted from the master controller 20M is supplied to the memory 67 and the timing controller 66 through the first selector 64 and used in the display drive control. Further, the scan enable signal EN outputted from the master controller 20M is supplied to the timing controller 66 through the second selector 65 and used in the display drive control.

In this manner, by using the display drivers 20 having the configuration shown in FIG. 6 as the master controller 20M and the slave controller 20S, the slave controller 20S performs the display drive control using the scan enable signal EN and the clock signal CLK generated by the master controller 20M. In other words, the master controller 20M and the slave controller 20S can perform the driving of the display panels 11 and 12 in scan synchronization using the common clock signal CLK and the common scan enable signal EN.

<Display Start and Display Stop Control>

Hereinafter, a specific example of the display start and the display stop control by the master controller 20M and the slave controller 20S will be described with reference to FIGS. 7A to 9B.

In FIGS. 7A to 9B, the write signal WR indicates the timing at which the display start command signal or the display stop command signal from the MPU 2 is introduced into the master controller 20M or the slave controller 20S. Further, the master controller 20M and the slave controller 20S respectively start the line scannings by the cathode drivers 21M and 21S when the scan enable signal EN is of the H level. The interrupt signals INT1 and INT2 are used to indicate the beginning of the frame as described above. The ON of display indicates a time period during which image display is performed in the display panels 11 and 12, and the OFF of display indicates a period during which image display is not performed on the display panels 11 and 12.

Specifically, the display ON may be a time period for which line scanning (hereinafter also called "cathode scan") for the scanning lines 23M and 23S by the cathode drivers 21M and 21S and outputting of the display data signal (hereinafter also called "anode signal output") to the display data lines 22M and 22S by the anode driver 68 are performed. Further, the display OFF may be a time period for which both the cathode scan and the anode signal output are not performed basically. However, since the image display is not performed during a period for which the anode signal output is not performed while the cathode scan is performed, this period may also correspond to the display OFF.

In the present embodiment, in order to achieve the scan synchronization in the display panels 11 and 12, as described above, the clock signal CLK and the scan enable signal EN are commonly used in the master controller 20M and the slave controller 20S. Additionally, in order to achieve the scan synchronization, it is necessary to appropriately control the timings of the display start and the display stop. The display start and the display stop control are affected by the timing of the command signal inputted from the MPU 2. It is preferred that the command signal from the MPU 2 is simultaneously applied to the master controller 20M and the slave controller 20S all the time, but the command signal may not be actually inputted to the master controller 20M and the slave controller 20S at the same time.

The MPU 2 selects either or both of the master controller 20M and the slave controller 20S by the chip selection signals CS1 and CS2 and outputs the command signal to either or both of the master controller 20M and the slave controller 20S. For example, if the display start command signal is supplied at different timings to the master controller 20M and the slave controller 20S from the MPU 2, the timings for capturing the command signal by the master controller 20M and the slave controller 20S deviate from each other.

Further, even if the display start command signal is supplied simultaneously to the master controller 20M and the slave controller 20S, the master controller 20M and the slave controller 20S may actually capture the command signal at different timing. In the present embodiment, in order to appropriately achieve the scan synchronization with respect to the display panels 11 and 12 regardless of the timings for capturing the command signal by the master controller 20M and the slave controller 20S, the following operations (1) to (3) are performed.

(1) The master controller 20M starts and stops the cathode scan in response to the display start and the display stop command signal, respectively. The slave controller 20S starts and stops the cathode scan in response to the scan enable signal EN inputted from the master controller 20M.

(2) Each of the master controller 20M and the slave controller 20S starts and stops the anode signal output at a predetermined timing (e.g., at the beginning of the frame) in response to the display start and the display stop command signal.

(3) When the cathode scan is stopped, the anode signal output is also stopped.

The above (1) is satisfied by using the display driver 20 illustrated in FIG. 6 as the master controller 20M and the slave controller 20S. Specifically, in the display driver 20 serving as the master controller 20M, the timing controller 66 uses the scan enable signal EN generated by the scan enable signal generating unit 63 at the timing based on the command signal. On the other hand, in the display driver 20 serving as the slave controller 20S, instead of the scan enable signal EN generated by the scan enable signal generating unit 63, the timing controller 66 uses the scan enable signal EN supplied from the master controller 20M.

With regard to (2), the timing controller 66 of each of the master controller 20M and the slave controller 20S starts the anode signal output from the anode driver 68 at the beginning of the frame after the display start command signal is received, and stops the anode signal output from the anode driver 68 when the display stop command signal is received.

With regard to (3), when the cathode scan is stopped, the timing controller 66 of each of the master controller 20M and the slave controller 20S stops the anode signal output.

Based on the above, first, an example of display start control will be described with reference to FIGS. 7A to 7D. FIG.

7A shows an operation example (master operation example I) of the master controller 20M. It is assumed that the master controller 20M captures the display start command signal at a time point Tms, i.e., at the rising edge of the write signal WR.

The scan enable signal generating unit 63 of the master controller 20M sets the scan enable signal EN to the H level at, e.g., a time point Ten at which a delay time DL has elapsed from the time point Tms. When the scan enable signal EN becomes the H level, the timing controller 66 of the master controller 20M starts the cathode scan and the anode signal output (see the above (1) and (2)). Accordingly, at the time point Ten, the frame begins (see INT1), and the display is started (the display ON) in the display panel 11.

Figure 7A:
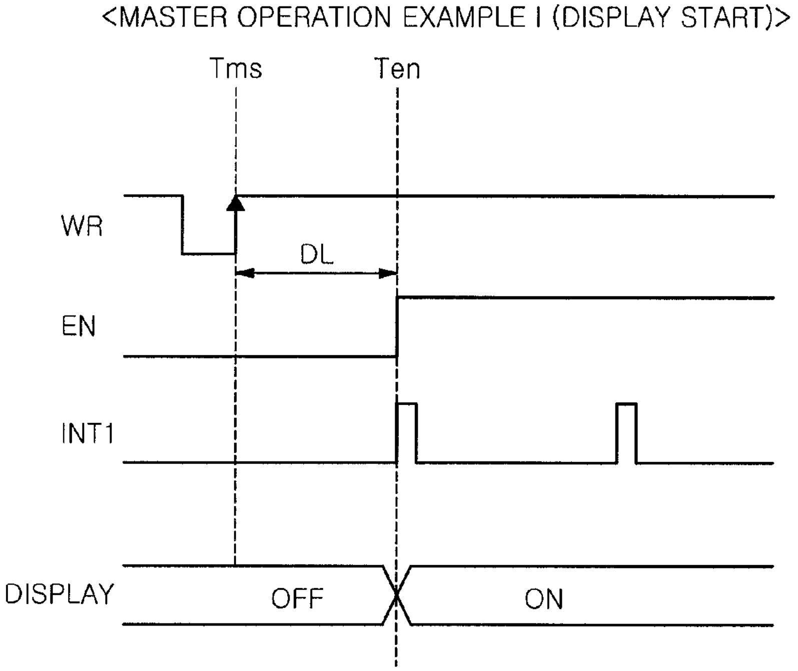
FIGS. 7A to 7D are diagrams for explaining display start operations in the display device according to the embodiment.
Figure 7B:
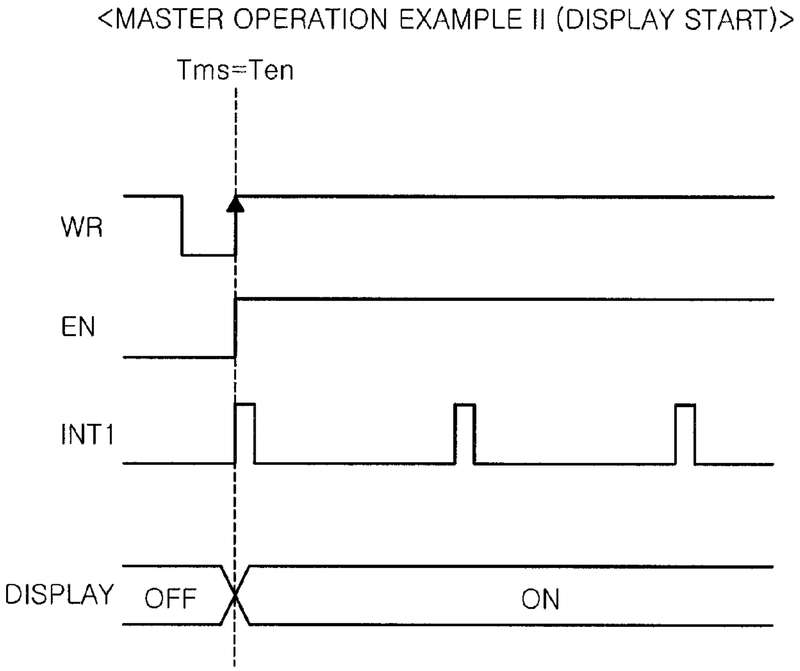
Figure 7C:
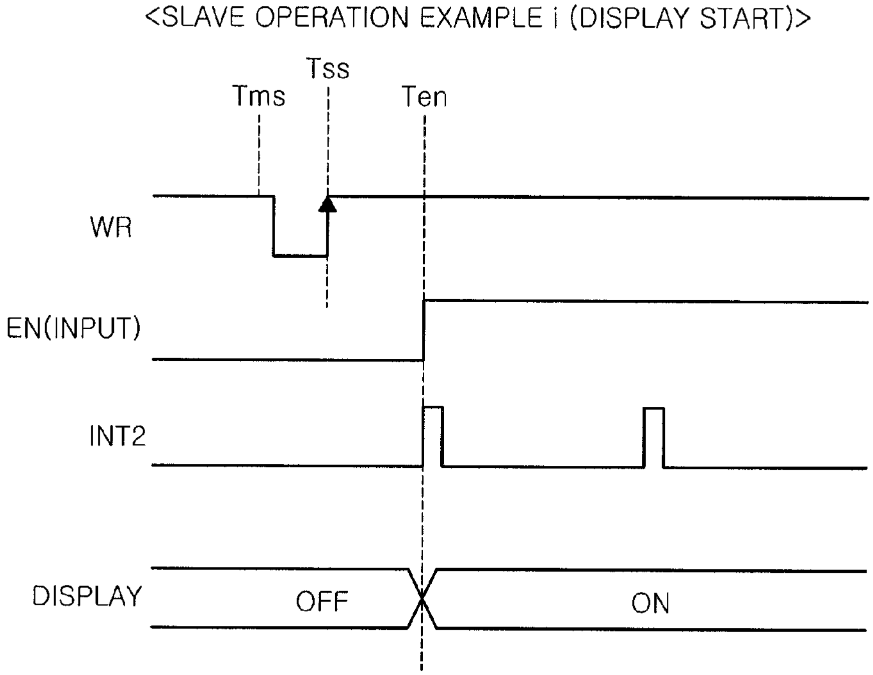
Figure 7D:
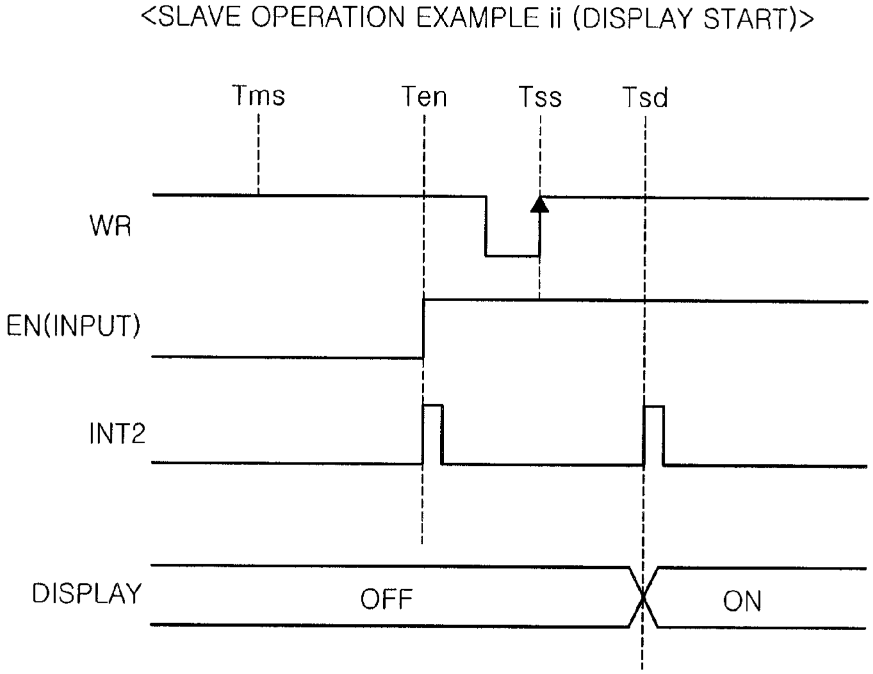

In response to the master operation example I of FIG. 7A, a slave operation example i shown in FIG. 7C or a slave operation example ii shown in FIG. 7D is executed in the slave controller 20S.

Specifically, the slave operation example i of FIG. 7C shows a case where the slave controller 20S captures the display start command signal at a time point Tss, i.e., at the rising edge of the write signal WR. In this case, the time point Tss is the same time with or slightly delayed from the time point Tms described in FIG. 7A before the time point Ten. The timing controller 66 of the slave controller 20S starts the cathode scan at the time point Ten when the scan enable signal EN supplied from the master controller 20M becomes the H level, and starts the anode signal output at the beginning of the frame according to the display start command signal (see the above (1) and (2)). Accordingly, at the time point Ten, the frame begins (see INT2), and, in the display panel 12, the display is started (the display ON).

Thus, the start timing of the cathode scan and the anode signal output in the display panel 11 coincides with those in the display panel 12. Moreover, since the cathode scan and the anode signal output are performed based on the common clock signal CLK, the same numbered the lines on the display panels 11 and 12 emit light simultaneously all the time.

The slave operation example ii of FIG. 7D shows a case in which the time point Tss at which the slave controller 20S captures the display start command signal in response to the write signal WR is later than the time point Ten at which the scan enable signal EN becomes the H level in the master controller 20M.

At the time point Ten when the scan enable signal EN supplied from the master controller 20M becomes the H level, the timing controller 66 of the slave controller 20S starts the cathode scan even before receiving the display start command signal (see the above (1)). Accordingly, at the time point Ten, the frame begins (see INT2). However, since the anode signal output is started according to the display start command signal (see the above (2)), the anode signal output is not started yet and the display is not started in the display panel 12 (the display OFF).

Then, when acquiring the display start command signal at the time point Tss, the timing controller 66 of the slave controller 20S starts the anode signal output at a time point Tsd, i.e., at the beginning of the next frame. Accordingly, the display is started in the display panel 12 (the display ON). Thus, in this case, the start timing of the cathode scan of the display panel 11 coincides with that of the display panel 12, but the start timing of the anode signal output of the display panel 11 does not coincide with that of the display panel 12, and the timing of the display ON of the display panel 11 deviates from that of the display panel 12. However, since the cathode scan is performed in time synchronization between the display panels 11 and 12 and the cathode scan and the anode signal output are started based on the common clock signal CLK, the same numbered lines of the display panels 11 and 12 are made to emit light all the time after the display panel 12.

Further, FIG. 7B shows an operation example (master operation example II) of the master controller 20M in which the delay time DL is not provided unlike that shown in FIG. 7A.

In this case, at the same time when the master controller 20M captures the display start command signal at the time point Tms, i.e., at the rising edge of the write signal WR, the scan enable signal generating unit 63 sets the scan enable signal EN to the H level (at the time point Ten). When the scan enable signal EN becomes the H level, the timing controller 66 starts the cathode scan, and also starts the anode signal output (see the above (1) and (2)). Thus, at the time point Tms (=Ten), the frame begins (see INT1), and in the display panel 11, the display is started (the display ON).

In the case in which the delay time DL is not provided as shown in FIG. 7B which is conceivable, even though the slave controller 20S mostly performs the operation as shown in FIG. 7D and the timing of the display ON of the display panel 11 is different from that of the display panel 12, the scan synchronization is ensured. However, if it is desired to synchronize the display ON of the display panels 11 and 12, it is preferred that a delay time DL from the generation of the scan enable signal EN is provided as shown in FIG. 7A. For example, when the delay time DL is set to be equal to the display time of at least one frame, it is certain that the slave controller 20S will capture the display start command signal during the delay time DL. As a result, the master controller 20M and the slave controller 20S may perform the display ON of the display panels 11 and 12 simultaneously at the time point Ten of FIG. 7C.

Alternatively, the MPU 2 may transmit the display start command signal to the slave controller 20S earlier than the master controller 20M. In this case, on the side of the slave controller 20S, the cathode scan is not started (see the above (1)) and, thus, the anode signal output is not performed (see the above (3)). Accordingly, the display panel 12 remains in the display OFF state. The display panel 12 does not become the display ON state until the scan enable signal EN is set to be the H level on the side of the master controller 20M.

Figure 8A:
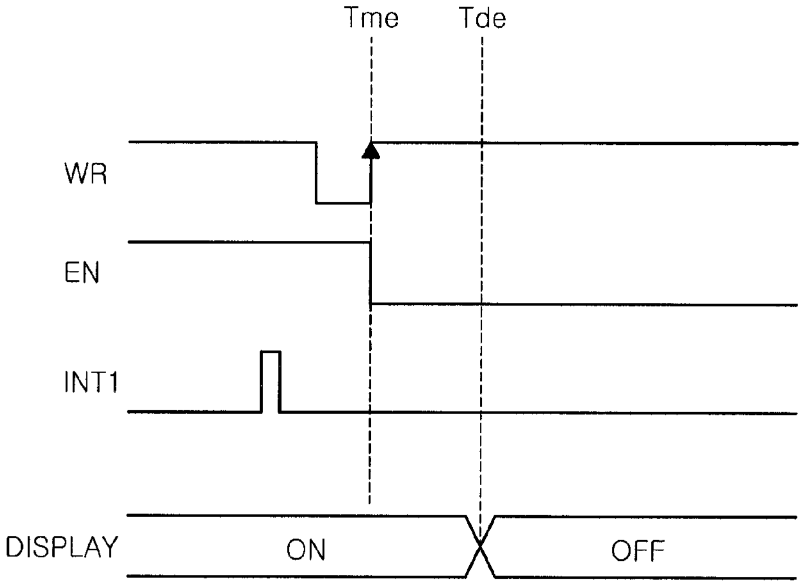
FIGS. 8A to 8C are diagrams for explaining display stop operations in the display device according to the embodiment.

Next, an example of the display stop control will be described with reference to FIGS. 8A to 9B. FIG. 8A shows an operation example (master operation example III) of the master controller 20M. It is assumed that the master controller 20M captures the display stop command signal at a time point Tme, i.e., at the rising edge of the write signal WR.

The scan enable signal generating unit 63 of the master controller 20M sets the scan enable signal EN to the L level at the time point Tme. When the scan enable signal EN becomes to the L level, the timing controller 66 of the master controller 20M stops the cathode scan at a time point Tde, i.e., at the end of the current frame. Further, the timing controller 66 of the master controller 20M also stops the anode signal output at the time point Tde, i.e., at the end of the current frame, according to the display stop command signal (see the above (1) and (2)). Accordingly, in the display panel 11, the display stops (display OFF) at the time point Tde.

Figure 8B:
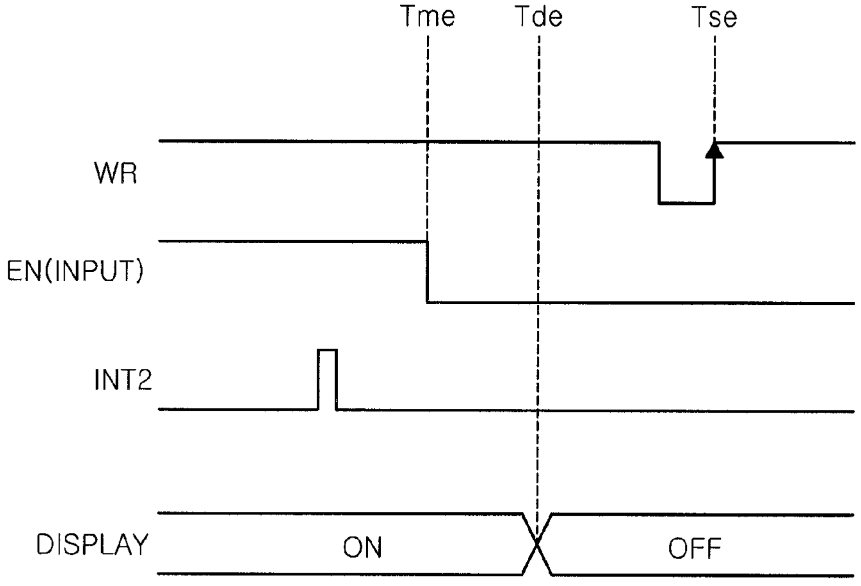
Figure 8C:
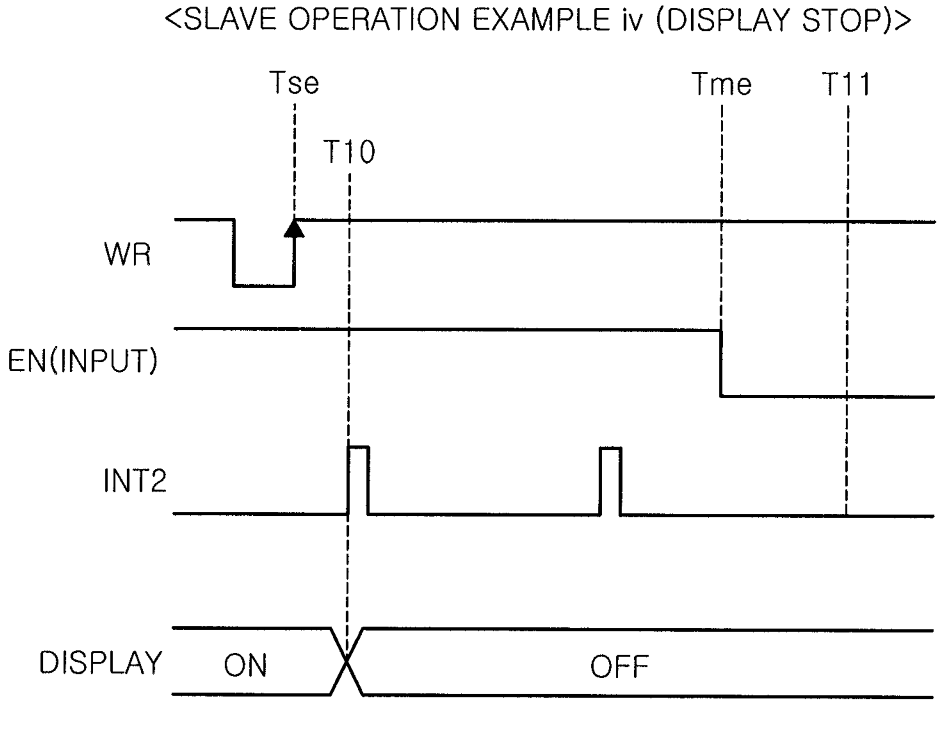
Figure 9A:
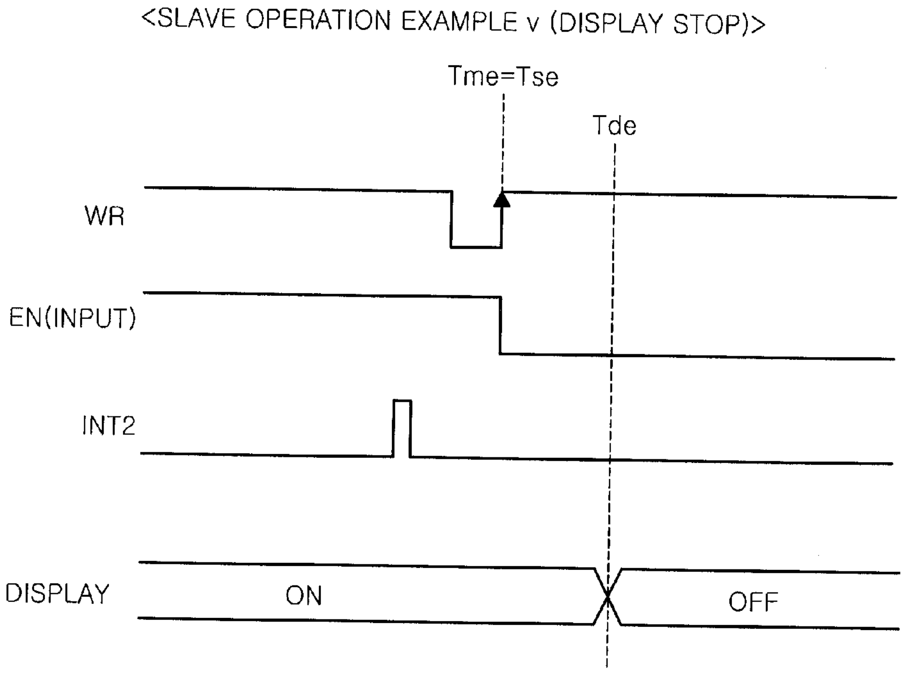
FIGS. 9A and 9B are diagrams for explaining display stop operations in the display device according to the embodiment.
Figure 9B:
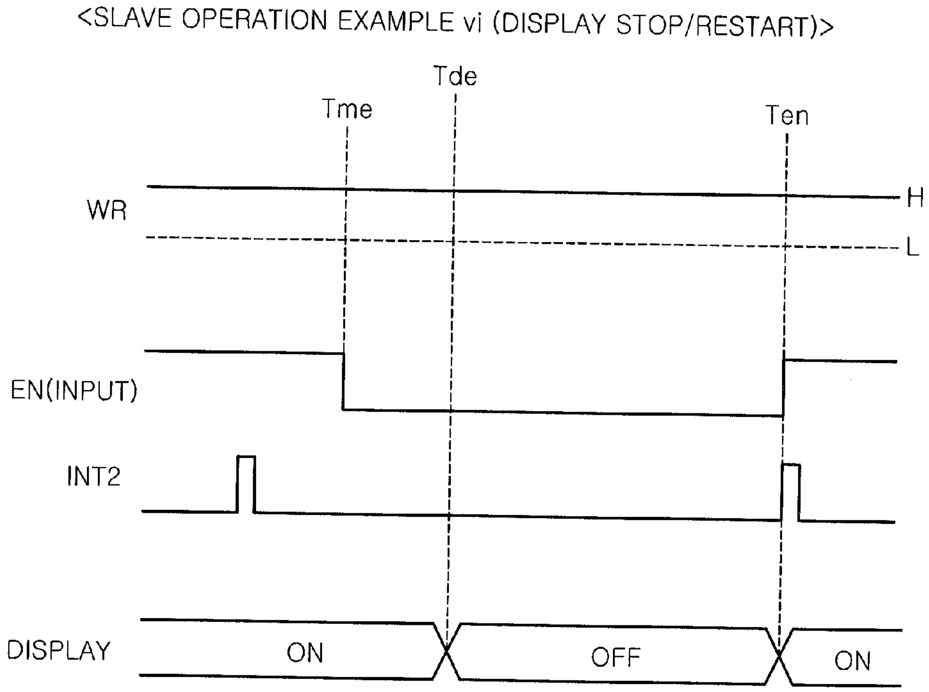

On the side of the slave controller 20S, a slave operation example iii shown in FIG. 8B, a slave operation example iv shown in FIG. 8C, a slave operation example v shown in FIG. 9A, or a slave operation example vi shown in FIG. 9B is performed. First, the slave operation example iii of FIG. 8B shows a case where a time point Tse at which the slave controller 20S captures the display stop command signal is later than the time point Tme of FIG. 8A.

When the scan enable signal EN from the master controller 20M becomes the L level at the time point Tme, the timing controller 66 of the slave controller 20S stops the cathode scan at the time point Tde, i.e., at the end of the current frame. Further, the timing controller 66 of the slave controller 20S also stops the anode signal output according to the stop of the cathode scan (see the above (1) and (3)). Thus, the display in the display panel 12 stops (the display OFF) prior to the time point Tse. That is, the display panels 11 and 12 become the display OFF state at the same time.

The slave operation example iv of FIG. 8C shows a case where the slave controller 20S captures the display stop command signal earlier than the master controller 20M. When capturing the display stop command signal at the time point Tse, the timing controller 66 of the slave controller 20S stops the anode signal output at a time point T10, i.e., at the end of the current frame (see the above (2)). At this point, the cathode scan is continued (see the above (1)), but the display panel 12 becomes the display OFF state because the anode signal output is stopped.

Thereafter, when the master controller 20M captures the display stop command signal and sets the scan enable signal EN to the L level at the time point Tme, the timing controller of the slave controller 20S stops the cathode scan at a time point T11, i.e., at the end of the current frame (see the above (1)). Thus, in this case, the anode signal output stops in the display panel 12 earlier than in the display panel 11, but the cathode scan in the display panel 12 is continued until the cathode scan in the display panel 11 is stopped.

If the display start command signal is applied to the slave controller 20S while the display stop command signal is being not issued to the master controller 20M, the slave controller 20S resumes the anode signal output. However, since the cathode scan has been continued, the state in which the scan synchronization is achieved is maintained.

The slave operation example v of FIG. 9A shows a case in which the master controller 20M and the slave controller 20S capture the display stop command signal at the same time. The timing controller 66 of the slave controller 20S captures the display stop command signal at the time point Tse (=time point Tme of FIG. 8A). At the same time, the scan enable signal EN from the master controller 20M is set to the L level, and the timing controller 66 of the slave controller 20S stops the cathode scan at the time point Tde, i.e., at the end of the current frame (see the above (1)). Further, in response to capturing the display stop command signal, the anode signal output stops at the time point Tde, i.e., at the end of the current frame (see the above (2)). Therefore, the display panels 11 and 12 become the display OFF state at the same time.

The slave operation example vi of FIG. 9B shows a case where only the master controller 20M captures the display stop command signal at the time point Tme and, then, captures the display start command signal. In the meantime, the slave controller 20S does not capture the command signal.

In this case, the scan enable signal EN is set to the L level at the time point Tme, and set to the H level again at the time point Ten. When the scan enable signal EN becomes the L level, the timing controller 66 of the slave controller 20S stops the cathode scan at the time point Tde, i.e., at the end of the current frame, and stops the anode signal output at the same time (see the above (1) and (3)). Thus, the display panel 12 becomes the display OFF state at the time point Tde.

When the scan enable signal EN becomes the H level at the time point Ten, the timing controller 66 of the slave controller 20S starts the cathode scan, and also starts the anode signal output (see the above (1) and (2)). Accordingly, at the time point Ten, the frame begins (see INT2), and, in the display panel 12, the display is started (display ON).

Thus, even if only the master controller 20M acquires the display stop command signal and then the display start command signal, the display OFF and the display ON are performed in time synchronization between the display panels 11 and 12. Further, the scan synchronization is achieved during the display ON.

Summary and Modification Example

As described above, in the display device 1 according to the present embodiment, the master controller 20M is configured to output the generated clock signal CLK and the scan enable signal EN (scanning control signal) (from the terminals 31 and 32 of FIG. 3, and the terminals 69 and 71 of FIG. 6). Further, the slave controller 20S is configured to receive the clock signal CLK and the scan enable signal EN (scanning control signal) (through the terminals 33 and 34 of FIG. 3, and the terminals 70 and 72 of FIG. 6). By this configuration, the clock signal CLK and the scan enable signal EN being used in the master controller 20M can be supplied to the slave controller 20S.

In the above display device 1, the wires 51 and 52 are provided as supply paths of the clock signal CLK and the scan enable signal EN as shown in FIG. 3. Then, the master controller 20M performs the driving of the display panel 11 on the basis of the scan enable signal EN (scanning control signal) and the clock signal CLK which are generated internally, and outputs the generated scan enable signal EN and clock signal CLK. The slave controller 20S performs the driving of the display panel 12 on the basis of the scan enable signal EN and the clock signal CLK inputted from the master controller 20M.

Therefore, it is possible to use the scan enable signal EN defining the start timing of the cathode scan and the clock signal CLK used in the cathode scan in common, and appropriately achieve the scan synchronization. Accordingly, in the display panels 11 and 12, the same numbered lines can be selected all the time, and a case in which the adjacent lines emit light as explained with reference to FIGS. 2A to 2C does not occur. Thus, in the case of increasing the screen size and the brightness by using a plurality of display panels, it is possible to eliminate the occurrence of the bright line due to mutual interference between the lines, and realize the improvement of display quality.

In the present embodiment, the master controller 20M generates the scan enable signal EN indicating the line scanning start at a timing based on the inputted display start command signal, and controls the line scanning (cathode scan) start accordingly. The slave controller 20S performs the line scanning start according to the scan enable signal EN supplied from the master controller 20M. Thus, it is possible to make the line scanning start timing on the side of the master controller 20M coincide with the line scanning start timing on the side of the slave controller 20S. As a result, it is possible to allow the same numbered lines to emit light in the display panels (maintain the scan synchronization).

In the present embodiment, each of the master controller 20M and the slave controller 20S start the display data output (anode signal output) to the pixels of each line of the corresponding display panel at a timing based on the inputted display start command signal. Even when the display data outputs in the display panels are not started at the same time, the line scanning is carried out in accordance with the common scan enable signal EN and the scan synchronization is obtained. Accordingly, only by starting display data output (anode signal output) according to the display start command signal, the display panels 11 and 12 can perform a display operation corresponding to the command signal.

In the present embodiment, the master controller 20M generates the scan enable signal EN indicating a line scanning stop in response to the inputted display stop command signal, and stops the line scanning (cathode scan) at the end of the current frame accordingly. The slave controller 20S stops the line scanning (cathode scan) at the end of the current frame according to the scan enable signal EN indicating the line scanning stop which is supplied from the master controller 20M. Thus, in accordance with the display stop command signal, it is possible to make the scanning end timing of the display panel 11 coincide with the scanning end timing of the display panel 12.

In the present embodiment, when the line scanning (cathode scan) stops, each of the master controller 20M and the slave controller 20S stops the display data output (anode signal output) to the pixels of each line. Thus, the display data output is stopped with the line scanning end of each of the display panels 11 and 12, and the image display is turned off in each of the display panels 11 and 12. This prevents unnecessary anode signal output.

Further, the slave controller 20S stops the display data output (anode signal output) to the pixels of each line at the end of the current frame according to the display stop command. Thus, the slave controller 20S can perform the display OFF of the display panel 12 according to the display stop command only for the slave controller 20S. In other words, it is possible to respond to the command signal only for the slave controller 20S. Even in this case, since the cathode scan is continued as long as the scan enable signal EN is set to the H level, it is also possible to maintain the scan synchronization during the display ON after that.

The display driver 20 shown in FIG. 6 can be used in common in the master controller 20M and the slave controller 20S. Accordingly, the display device 1 may be configured by effectively utilizing the display driver 20 and it is effective in manufacturing efficiency improvement, cost reduction and the like.

In the case of using the display driver 20 as the master controller 20M, it can be configured such that the selector 64 selects the clock signal CLK generated by the oscillator 62, and the selector 65 selects the scan enable signal EN generated by the scan enable signal generating unit 63. Further, in the case of using the display driver 20 as the slave controller 20S, it can be configured such that the selector 64 selects the clock signal CLK inputted from the terminal 70, and the selector 65 selects the scan enable signal EN inputted from the terminal 72. Such selection may be readily set by using the M/S signal.

The display device 1, the display driving method performed in the display device 1, and the display driver 20 according to the present embodiment as the above are very useful to the realization of a display device using, e.g., an OLED as a light emitting element, particularly, a large, high-definition display device.

The present invention is not limited to the exemplary embodiment, and various modifications are conceivable. The display driver 20 of FIG. 6 may be configured such that the clock signal CLK selected by the selector 64 is supplied to the memory 67 to be used in a write/read operation of data, without directly supplying the clock signal CLK from the oscillator 62 to the memory 67.

Further, the display drivers 20 serving as the master controller 20M and the slave controller 20S may have different configurations. In this case, the display driver 20 serving as the master controller 20M may be realized by a configuration in which the selectors 64 and 65 and the terminals 69 to 73 are not provided in the configuration of FIG. 6. The display driver 20 serving as the slave controller 20S may be realized by a configuration in which the selectors 64 and 65, the scan enable signal generating unit 63, the oscillator 62 and the terminals 69, 71 and 73 are not provided in the configuration of FIG. 6, and the clock signal CLK and the scan enable signal EN from the terminals 70 and 72 are inputted directly to the timing controller 66.

Although the display unit 10 is constituted by two display panels 11 and 12 in the embodiment, it may be configured to form one screen by arranging three or more display panels adjacent to each other in the line scanning direction. In this case, it may be configured such that a display driver of one of the display panels is used as the master controller 20M, display drivers of the other display panels are used as the slave controllers 20S and the clock signal CLK and the scan enable signal EN is supplied from the master controller 20M to the slave controllers 20S.

The present invention is applicable not only to display devices using OLED, but also to other types of display devices using LCD, VFD, FED and the like.

While the invention has been shown and described with respect to the embodiments, it will be understood by those skilled in the art that various changes and modification may be made without departing from the scope of the invention as defined in the following claims.

What is claimed is:

1. A display device comprising: a plurality of display panels arranged adjacent to each other in a line scanning direction to form one screen; a master controller configured to drive one of the display panels; and one or more slave controllers configured to drive the other display panels, each of the slave controllers corresponding to each of the other display panels, wherein the master controller is configured to drive the display panel based on a scanning control signal and a clock signal which are generated, and output the generated scanning control signal and the generated clock signal, and wherein each of the slave controllers is configured to drive the corresponding display panel based on the scanning control signal and the clock signal inputted from the master controller, wherein each of the master controller and the slave controllers comprises: a clock generator; a first selector that selects one of the clock signal generated by the clock generator and the clock signal which is inputted; a scanning control signal generator that generates the scanning control signal in response to a command which is inputted; a second selector that selects one of the scanning control signal generated by the scanning control signal generating unit and the scanning control signal which is inputted; and a timing controller configured to control line scanning and display data output by using the clock signal selected by the first selector and the scanning control signal selected by the second selector.

2. The display device of claim 1, wherein each of the slave controllers receives the scanning control signal and the clock signal outputted from the master controller, and drives the corresponding display panel based on the scanning control signal and the clock signal received.

3. The display device of claim 2, wherein the master controller generates the scanning control signal indicating line scanning start at a timing based on a display start command which is inputted, and performs the line scanning start according to the scanning control signal, and wherein each of the slave controller performs the line scanning start according to the scanning control signal supplied from the master controller.

4. The display device of claim 3, wherein each of the master controller and the slave controllers starts display data output to pixels of each line of the corresponding display panel at the timing based on the display start command.

5. The display device of claim 2, wherein the master controller generates the scanning control signal indicating line scanning stop in response to a display stop command which is inputted, and performs the line scanning stop at the end of a current frame according to the scanning control signal of the line scanning stop, and wherein each of the slave controllers performs the line scanning stop at the end of a current frame according to the scanning control signal of the line scanning stop, which is supplied from the master controller.

6. The display device of claim 4, wherein the master controller generates the scanning control signal indicating line scanning stop in response to a display stop command which is inputted, and performs the line scanning stop at the end of a current frame according to the scanning control signal of the line scanning stop, and wherein each of the slave controllers performs the line scanning stop at the end of a current frame according to the scanning control signal of the line scanning stop, which is supplied from the master controller.

7. The display device of claim 5, wherein each of the master controller and the slave controllers stops display data output to pixels of each line along with the line scanning stop.

8. The display device of claim 6, wherein each of the master controller and the slave controllers stops the display data output to pixels of each line along with the line scanning stop.

9. The display device of claim 7, wherein each of the slave controllers stops the display data output to the pixels of each line at the end of a current frame in response to the display stop command.

10. The display device of claim 8, wherein each of the slave controllers stops the display data output to the pixels of each line at the end of a current frame in response to the display stop command.

11. The display device of claim 1, wherein the master controller is configured such that the first selector selects the clock signal generated by the clock generator, and the second selector selects the scanning control signal generated by the scanning control signal generating unit, and wherein each of the slave controllers is configured such that the first selector selects the clock signal which is inputted, and the second selector selects the scanning control signal which is inputted.

12. A display driving method for a plurality of display panels which is arranged adjacent to each other in a line scanning direction to form one screen, the method comprising: driving, by a master controller corresponding to one of the display panels, the corresponding display panel based on a scanning control signal and a clock signal which are generated, and outputting the scanning control signal and the clock signal; and receiving the scanning control signal and the clock signal outputted from the master controller by each of slave controllers corresponding respectively to the other display panels, and driving the corresponding display panel based on the scanning control signal and the clock signal, the method further comprising the steps: selecting one of the clock signal generated by the clock generator and the clock signal which is inputted using a first selector;

generating the scanning control signal in response to a command which is inputted using a scanning control signal generating unit; selecting one of the scanning control signal generated by the scanning control signal generating unit and the scanning control signal which is inputted using a second selector; and controlling line scanning and display data output by using the clock signal selected by the first selector and the scanning control signal selected by the second selector using a timing controller.

* * * * *